United States Patent
Tian et al.

(10) Patent No.: US 7,277,468 B2
(45) Date of Patent: Oct. 2, 2007

(54) MEASURING QUALITY OF SERVICE OF BROADCAST MULTIMEDIA SIGNALS USING DIGITAL WATERMARK ANALYSES

(75) Inventors: Jun Tian, Tualatin, OR (US); Kenneth L. Levy, Stevenson, WA (US); Hugh L. Brunk, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1013 days.

(21) Appl. No.: 09/951,143

(22) Filed: Sep. 10, 2001

(65) Prior Publication Data

US 2002/0076084 A1 Jun. 20, 2002

Related U.S. Application Data

(63) Continuation-in-part of application No. 09/731,456, filed on Dec. 6, 2000, which is a continuation-in-part of application No. 09/938,870, filed on Aug. 23, 2001, which is a continuation-in-part of application No. 09/840,016, filed on Apr. 20, 2001, now Pat. No. 6,760,464.

(60) Provisional application No. 60/232,163, filed on Sep. 11, 2000.

(51) Int. Cl.
*H04B 1/00* (2006.01)

(52) U.S. Cl. ................ 375/130; 358/3.28; 380/201

(58) Field of Classification Search ................ 375/130; 713/176; 358/3.28; 380/201, 203, 28, 55
See application file for complete search history.

(56) References Cited

U.S. PATENT DOCUMENTS

| | | | |
|---|---|---|---|
| 5,200,822 A | 4/1993 | Bronfin et al. | |
| 5,355,161 A | 10/1994 | Bird et al. | |
| 5,636,292 A | 6/1997 | Rhoads | |
| 5,710,834 A | 1/1998 | Rhoads | |
| 5,721,788 A | 2/1998 | Powell et al. | |
| 5,748,783 A | 5/1998 | Rhoads | |
| 5,768,426 A | 6/1998 | Rhoads | |
| 5,818,520 A | 10/1998 | Janko et al. | |
| 5,841,978 A | 11/1998 | Rhoads | |
| 5,848,155 A * | 12/1998 | Cox | 382/191 |
| 5,915,027 A * | 6/1999 | Cox et al. | 380/54 |
| 6,069,914 A * | 5/2000 | Cox | 375/150 |
| 6,122,403 A | 9/2000 | Rhoads | |
| 6,145,042 A * | 11/2000 | Walton | 710/112 |
| 6,246,439 B1 | 6/2001 | Zink et al. | |

(Continued)

OTHER PUBLICATIONS

Cox, I. J., et al. Dec. 1997. IEEE Transactions on Image Processing. vol. 6, No. 12, pp. 1673-1687. Secure Spread Spectrum Watermarking for Multimedia.*

(Continued)

*Primary Examiner*—Khanh Tran

(57) ABSTRACT

The disclosure details a method of measuring the quality of service of broadcast media signals by analyzing digital watermarks embedded in the received broadcast signal. This method enables the quality of the broadcast video or audio signal to be measured without having the original version of the signal before broadcast transmission. Instead, the method analyzes the strength or quality of the embedded digital watermark to determine the quality of the received broadcast signal. The degradation of a watermark signal is used to measure quality of service of broadcast signals, such as audio and video.

17 Claims, 1 Drawing Sheet

U.S. PATENT DOCUMENTS

| | | | |
|---|---|---|---|
| 6,285,775 B1 | 9/2001 | Wu et al. | |
| 6,332,031 B1 | 12/2001 | Rhoads et al. | |
| 6,385,329 B1 * | 5/2002 | Sharma et al. | 382/100 |
| 6,415,041 B1 * | 7/2002 | Oami et al. | 382/100 |
| 6,512,837 B1 | 1/2003 | Ahmed | |
| 6,532,541 B1 * | 3/2003 | Chang et al. | 713/176 |
| 6,556,689 B1 * | 4/2003 | Xia et al. | 382/100 |
| 6,633,653 B1 * | 10/2003 | Hobson et al. | 382/100 |
| 6,694,041 B1 | 2/2004 | Brunk | |
| 6,721,459 B1 | 4/2004 | Honsinger et al. | |
| 7,007,166 B1 | 2/2006 | Moskowitz et al. | |
| 7,043,049 B2 * | 5/2006 | Kuzma | 382/100 |
| 2002/0031240 A1 | 3/2002 | Levy et al. | |
| 2002/0085238 A1 | 7/2002 | Umeda | |
| 2002/0146120 A1 | 10/2002 | Anglin et al. | |
| 2002/0178410 A1 | 11/2002 | Haitsma et al. | |
| 2004/0202348 A1 | 10/2004 | Kuzma | |

OTHER PUBLICATIONS

U.S. Appl. No. 09/731,456, filed Dec. 6, 2000, Levy et al.

Bender et al., "Applications for Data Hiding," IBM Systems Journal, vol. 39, Nos. 3&4, 2000, pp. 547-568.

Schneider et al., "A Robust Content Based Digital Signature for Image Authentication," IEEE 1996, pp. 227-230.

Zhu et al., "Transparent Robust Authentication and Distortion Measurement Technique for Images," IEEE 1996, pp. 45-48.

"Proposal of an Objective Picture Quality Measurement Method with a Reduced Reference Using Invisible Marker Signals," 8 pages, Mar. 2001.

Schneider et al, "A Robust Content Based Digital Signature for Image Authentication," 1996 IEEE Int. Conf. on Image Processing.

* cited by examiner

MEASURING QUALITY OF SERVICE OF BROADCAST MULTIMEDIA SIGNALS USING DIGITAL WATERMARK ANALYSES

RELATED APPLICATION DATA

This patent application is a continuation in part of U.S. patent application Ser. No. 09/731,456, filed Dec. 6, 2000, which claims benefit of U.S. Provisional Application 60/232,163 filed Sep. 11, 2000. This patent application is also a continuation in part of U.S. patent application Ser. No. 09/938,870, filed Aug. 23, 2001, which is a continuation in part of U.S. patent application Ser. No. 09/840,016, filed Apr. 20, 2001 (now U.S. Pat. No. 6,760,464). The above patent applications are hereby incorporated by reference.

TECHNICAL FIELD

The invention relates to steganography, data hiding, and authentication of media signals, such as images and audio signals.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 (now U.S. Pat. No. 6,614,914) and U.S. Pat. No. 5,862,260, which are hereby incorporated by reference. Examples of other watermarking techniques are described in U.S. Pat. No. 09/404,292, which is hereby incorporated by reference. Additional features of watermarks relating to authentication of media signals and fragile watermarks are described in U.S. patent application 60/198,138, 09/498,223 (now U.S. Pat. No. 6,574,350), Ser. No. 09/433,104 (now U.S. Pat. No. 6,636,615), and 60/232,163, which is hereby incorporated by reference.

The invention provides a method of measuring the quality of service of broadcast media signals by analyzing digital watermarks embedded in the received broadcast signal. This method enables the quality of the broadcast video or audio signal to be measured without having the original version of the signal before broadcast transmission. Instead, the method analyzes the strength or quality of the embedded digital watermark to determine the quality of the received broadcast signal.

One aspect of the invention is a method of measuring quality of service of a broadcast media signal using a digital watermark embedded in the broadcast media signal. The method extracts a digital watermark from the broadcast media signal, and evaluates the extracted digital watermark relative to a reference digital watermark to measure degradation in quality of service of the broadcast media signal based on differences between the extracted and reference digital watermarks. The method is implemented using fragile watermarks embedded in the broadcast multimedia signal. These fragile watermarks, which are imperceptible in the broadcast signal, are based on digital watermarks used for authentication of media objects. One digital watermark embedder, for example, transforms at least a portion of the media signal into a set of frequency coefficients in a frequency domain. For example, it applies a Fast Fourier Transform (FFT) or other frequency transform to blocks of a media signal, such as an image, audio or video signal. It adjusts a relationship between selected frequency coefficients to a reference value. This adjustment is selected so that an alteration to be detected, such as a re-sampling operation, lossy compression, broadcast transmission, or digital to analog- analog to digital conversion, alters the relationship. To detect the alteration, a detector computes the relationship in a potentially corrupted version of the signal.

Another digital watermark reader process evaluates signal peaks at selected frequency coefficients of the media signal. In a prior embedding process, the media signal has been modified to include peaks at the selected frequencies, such as by the technique summarized in the previous paragraph. The method determines, based on degradation of the signal peaks, whether the extent to which the quality of the media signal has been degraded. The frequency location of the peaks may vary from one application to the next. Another aspect of the invention is a watermark decoder, which includes a detector and analyzer for determining alteration of a watermarked media signal. The detector correlates a calibration signal with a media signal suspected of carrying a watermark to determine orientation parameters describing orientation of the media signal at embedding of the watermark. The calibration signal includes a set of peaks at selected frequency coefficients. The analyzer orients the media signal using the orientation parameters and evaluates whether the media signal has been altered or degraded by examining signal peaks at selected frequency coefficients in the media signal.

Further features will become apparent with reference to the following detailed description and accompanying drawings. The following description details methods for using digital watermarks for authenticating multimedia objects and measuring the quality of the multimedia objects as a function of digital watermark alteration. It also describes alternative implementations and applications.

DETAILED DESCRIPTION

Figure 1:
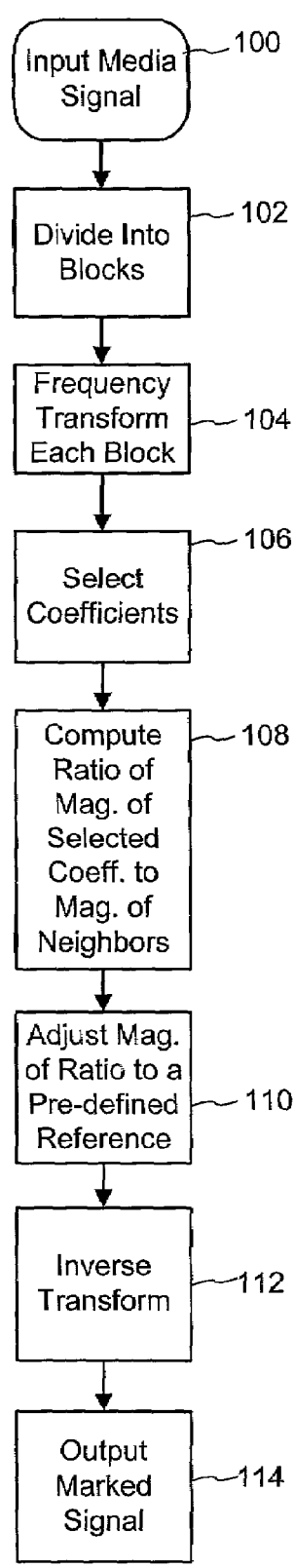
FIG. 1 is a flow diagram illustrating a process of embedding an authentication watermark in a media signal.

FIG. 1 is a flow diagram illustrating a process of embedding an authentication watermark in an input media signal (100), and in particular, in an image. The embedder begins by dividing a grayscale image into N×N blocks of samples at a specified resolution (102), where N is a pre-defined integer. For each block, the embedder computes a frequency transform of the image samples in that block (104), namely, a fast Fourier transform. From the mid-frequency and mid-high frequency coefficients, the embedder selects M Fourier transform coefficients (106), where M is a pre-defined integer. The coefficient locations are fixed by a pre-defined pattern. For example, the locations are scattered among roughly 25 to 100 coefficient locations in the mid to mid-high frequency range of a Fourier transform domain of a block of image samples where N ranges from 64 to 512 at spatial resolutions ranging from 75 to 600 dots per inch (DPI). The locations are symmetric about vertical and horizontal axes (and potentially diagonal axes) to facilitate detection as explained further below.

For each of the M selected coefficients, x, the embedder computes a ratio of the magnitude of a selected coefficient relative to the magnitude of its neighbors (108). In particular, it is a ratio of the magnitude of the selected coefficient to the average magnitude of the surrounding neighbors:

$r(x)$=Magnitude_of_$x$/Average_of_Magnitude_of_Eight_Neighbors_of_$x$

If $r(x)<r$, where r is a pre-defined reference value, the embedder increases the magnitude of x such that:

$r(x)=r$.

In this implementation, the value of r is a pre-defined constant. The reference may be derived dynamically from the input media signal. Also, the reference may be selected from a table of values so as to select the value of r in the table at the minimum distance from r(x). The adjustment to the host image is selected so as to be imperceptible or substantially imperceptible to a user in an output form of the watermarked signal.

Next, the embedder computes the inverse fast Fourier transform on each block to obtain the watermarked grayscale image (112). The watermarked image (114) may then undergo one or more transformations, such as digital to analog conversion, printing, scanning, analog to digital conversion, photocopying, etc. These transformations tend to corrupt the watermarked image in a predictable way.

The watermarking process of FIG. 1 may be combined with another watermarking process to embed other watermarks, either robust or fragile to transformations such as sampling distortions, geometric distortions, scaling, rotation, cropping, etc. In particular, the process may be combined with an embedding process described in pending application Ser. No. 09/503,881 or U.S. Pat. No. 5,862,260 to encode a calibration signal that enables a detector to compensate for distortions such as scaling, rotation, translation, differential scale, shear, etc. In one implementation, for example, the calibration signal comprises an array of impulse or delta functions scattered in a pattern in the Fourier domain of each block of image samples. To embed the pattern, the embedder perceptually adapts the calibration signal to the host image block and adds it to that block. The impulse functions of the calibration signal have a pre-defined magnitude and pseudo-random phase. To make the calibration signal less perceptible yet detectable, the embedder modulates the energy of the calibration signal according to the data hiding attributes (e.g., local contrast) of the image samples to which it is added. Preferably, the locations of the impulse functions are scattered across a range of frequencies to make them robust to transformations like spatial scaling, rotation, scanning, printing, and lossy compression. Further, they are preferably arranged to be symmetric about vertical and horizontal axes in the Fourier domain to facilitate detection after flipping or rotating the watermarked image.

The frequency coefficient locations selected for the method illustrated in FIG. 1 may be mutually exclusive or overlap the coefficient locations of the calibration signal. The calibration signal preferably has impulse functions at lower frequencies to survive compression, scanning, printing, etc. while the pattern of coefficients employed in FIG. 1 includes coefficients at locations that are likely to be impacted by alterations to be detected, such as printing, scanning and photocopying. In the case where they overlap, the modification of the coefficients according to FIG. 1 is implemented so as not to interfere with the calibration signal. In particular, the embedder adjusts the selected coefficients as shown in FIG. 1 after the impulse functions of the calibration signal have been introduced, or the embedder calculates the watermarked signal taking into account the changes of the coefficient values due to the calibration signal and the process of FIG. 1.

Another approach is to adjust the selected frequency coefficients in the method of FIG. 1 so that those coefficients act as both a calibration signal and an authentication signal. The locations of the coefficients for the method of FIG. 1 and the delta functions of the calibration signal are the same. The embedder increases the magnitudes of selected mid to mid-high frequency coefficients relative to their neighbors to achieve the desired relationship with neighboring coefficients for authentication purposes. Since this modulation includes the addition of a delta function to the selected coefficients, it also inherently embeds a calibration signal comprised of delta functions at the selected locations. To compensate for rotation and scale, the detector performs a Fourier Mellin transform of the suspect signal and the calibration signal into a log-polar space and then correlates the two signals. The location of the correlation peak in log polar space provides the spatial scale and rotation parameters. These parameters may then be used to compensate for rotation and scale changes before performing additional watermark decoding operations, such as the authentication operations of FIG. 2.

To compute translation, the delta functions added to the selected coefficients may be given a known pseudorandom phase. In this case, the detector correlates the phase information of the calibration signal with the suspect signal after compensating for rotation and scale. The location of the correlation peak gives the translation offset in the horizontal and vertical directions.

In addition to being integrated with other watermark signal components, the process of FIG. 1 may be combined with a robust watermark embedding process to carry a multi-bit message payload carrying metadata or a link to metadata stored in an external database. Example implementations for embedding this type of robust watermark are described in pending application Ser. No. 09/503,881 and U.S. Pat. No. 5,862,260.

Figure 2:
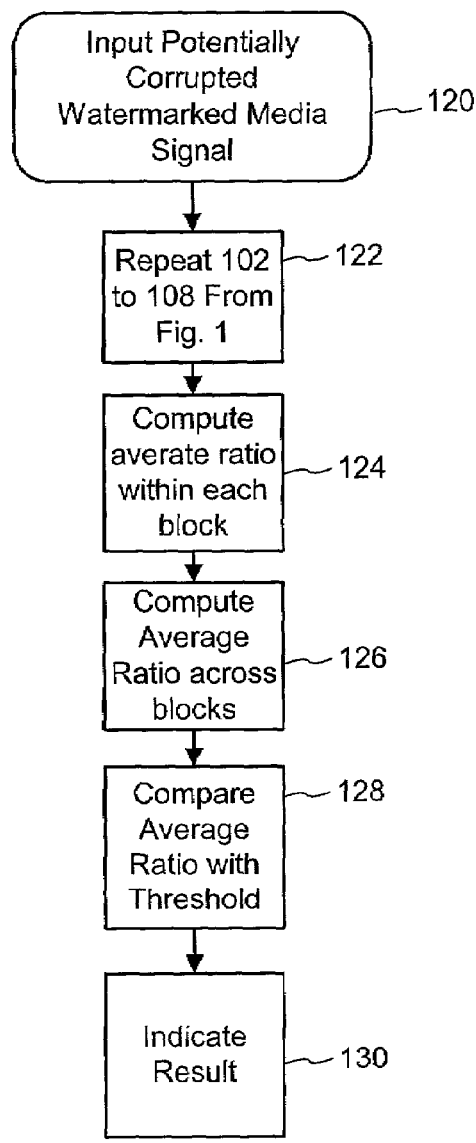
FIG. 2 is a flow diagram illustrating a process of detecting the authentication watermark from a potentially corrupted version of the watermarked signal.

FIG. 2 is a flow diagram illustrating a process of detecting the authentication watermark from a potentially corrupted version of the watermarked media signal (120) from the process of FIG. 1. The first four steps (122) are the same as shown in the embedder. For each block, the detector computes the average of r(x), where x is over all M selected coefficients (124), $$R = \text{Average\_of\_}r(x)$$

The detector computes the average of R over all blocks (126), $$AR = \text{Average\_of\_}R$$

A related approach is to use a weighted average as follows. For each block, the detector computes a weighted average of r(x), where x is over all M selected coefficients (124), $$R = \text{Sum\_of\_(weight\_for\_location\_}x*r(x))$$

In this approach, the weights are fixed positive constant, independent of the image, with the weight sum equal to 1. For copy detection applications, the weight for each location is adapted for printers and printing substrates used to produce original printed items.

The weighting factors are determined such that, for these printers and substrates, originals will be statistically optimally differentiated from copies. Based on our experiments, the weights in higher frequency components are usually higher. However the weights in the highest frequency components are actually tuned lower, because some reproduction devices (like photo copy machines) capture the highest frequency reasonably well, and the first (original) printing process introduces noise to the highest frequency components in the original printed items.

After obtaining the weighted average R for each block, the detector computes the average of R over all blocks (126), $$AR = \text{Average\_of\_}R''$$

To detect whether the watermarked signal has undergone alterations, the detector compares the average of R with a pre-defined threshold (128). If AR>=T, where T is a pre-defined threshold, then the detector classifies it as original. If AR<T, then the detector classifies it as a copy.

Depending on the application, the detector may indicate the result (130) to a user through some user interface (e.g., visual display, audio output such as text to speech synthesis, etc.). The detector may also indicate the result (130) to another software process or device to take further action, such as communicating the event to a another device or database for logging, recording tracer data about the user or device in which the alteration is detected, linking the detecting device to a network resource such as a web site at a specified URL that informs the user about usage rules, licensing opportunities, etc.

To make the process robust to geometric distortion, the detector includes a pre-processing phase in which it correlates a calibration signal with the potentially corrupted watermarked signal as described in pending application Ser. No. 09/503,881 or U.S. Pat. No. 5,862,260. Using a Fourier Mellin transform, the detector maps both the calibration signal and the received signal into a log polar coordinate space and correlates the signals (e.g., using generalized matched filters) to calculate estimates of rotation and scale. After compensating for rotation and scale, the detector uses the phase information of the calibration signal to compute translation, e.g., the origin or reference point for each block. Further correlation operations may be used to compute differential scale (e.g., the change in scale in the horizontal and vertical directions after watermarking). After compensating for geometric distortion, the detector executes the process of FIG. 2 to detect alteration in the selected frequency coefficients modified according to the method shown in FIG. 1.

While the invention is illustrated with respect to a specific implementation, it may be implemented in a variety of alternative ways. For example, the above example specifically refers to a grayscale image. This example may be adapted to other types of images including video and still imagery, color and monochrome images, etc. For color images, the embedding and detecting operations may be performed on two or more color channels, including luminance, chrominance or some other color channels. The embedding and detecting operations may be applied to frequency coefficients of alternative frequency transforms, such as DCT and wavelet, to name a few.

The embedding process shown in FIG. 1 may be performed on a portion of the host signal to create a watermark signal that is combined with the host signal. For example, in one possible implementation, the embedder pre-filters the host signal to yield a high pass filtered signal including content at the mid and high frequency ranges impacted by the watermark. The embedder makes the modification to this filtered signal, and then combines the resulting modified signal with the original signal.

The embedding and detecting processes may also be integrated into compression and decompression operations. For example, the frequency domain transform may be executed as part of a compression process, such as JPEG, JPEG 2000 or MPEG, where blocks of the signal are transformed into a frequency domain. Once converted to the frequency domain, frequency coefficients may be adjusted as described above.

The embedding and detecting operations apply to other media types, including audio media signals. In addition, the frequency domain coefficients may be selected and adjusted to reference values to detect other types of signal alteration, such as lossy compression, digital to analog and analog to digital conversion, downsampling and upsampling, etc.

Semi-Fragile Watermarks

A related watermarking approach is to use an array of Fourier magnitude impulse functions with random phase (a calibration signal, also referred to as a watermark synchronization or orientation signal) for semi-fragile, and copy and copy-attack resistant watermarks. Semi-fragile refers to a watermark that degrades in response to some types of degradation of the watermarked signal but not others. In particular for document authentication applications using such a watermark, the watermark decoder can determine if the watermark has been scanned and printed or battered by normal usage, potentially while being read with a web camera. The copy-attack relates to the assertion that one can use noise-reduction, i.e. Wiener filters, to lift a watermark and, then using threshold and masking techniques, one can re-embed it in a new image. Interestingly, these concepts are related because they both include an additional scanning and printing cycle, assuming the copy attack works on printed, not only digital, content. This type of semi-fragile watermark can be used to determine if a watermarked document has been copied, possibly using a high quality copier and low quality reader, and as such, can stop copying and can be used to measure quality of service.

One approach to implementing a semi-fragile watermark is to embed extra signal peaks in the Fourier magnitude domain that are of varying intensity, and have the watermark decoder determine if the watermark has been scanned and printed by the relative power of the extra and original calibration signal peaks. The extra peaks refer to a set of peaks used to implement the semifragile watermark. The original calibration signal peaks refer to the ones already included in the watermark to determine its orientation in a geometrically distorted version of the watermarked signal. For an example of such a calibration signal, see U.S. Pat. No. 5,862,260 and U.S. application Ser. No. 09/503,881, which are incorporated by reference. Some peaks are referred to as "extra" because they are included in addition to other peaks that form the original set of peaks in a calibration signal.

One advantage of including the semi-fragile watermark in the calibration signal is that the robust part of the watermark, which includes the desired detailed information such as a unique ID, is the multi-bit message, whereas the fragile part, which is only used to determine copying, is a few bit message. The fragile watermark can be considered as a single bit (copied or not) but actually allows more information by being frequency specific, as described below. Interestingly and potentially advantageously, the semi-fragile watermark is separate but inherently related to the robust watermark—thus they cannot be separated for successful copy attacks.

Specifically, the extra calibration signal peaks should be located at frequencies that best discriminates between the printing and scanning process, normal scuffing and a web camera reader. These locations can be determined by analyzing the frequency response of printing, scanning, scuffing and web cameras for frequency differences.

For example, a printing-scanning process may represent high-frequencies better than a camera, but not low frequencies. In addition, scuffing may show low-and-high frequency losses. Thus, the reader will be able to determine if the watermark has been copied, involving an additional scanning-printing process, by the relative intensities of the extra and original calibration signal peaks at low and high frequencies. In this example, high-and-low frequency loss is acceptable, whereas only low frequency loss represents a copied watermark.

In addition, the extra calibration signal peaks could also be dependent upon the content of the host signal, thus providing additional defense against the copy attack. For example, the host image samples could be broken in 16 equal sub-blocks, and the location of the extra peaks depends upon the average intensity of each quadrant to the total average intensity. Or, if only a section of the image is visible to the reader, each 32 by 32 sample block could be used in the above calculation instead of the complete image. Any "hash" of the host image that survives a web camera reader (referred to as a perceptual hash) could be used. To this end, if the watermark is moved to another picture, after it is read, it is less likely that the extra calibration signal peak locations are correct, not to mention that the less intense calibration signal points have been removed by the additional scanning-printing process.

Alternatively, in regards to the copy attack, the content dependent information could be used to slightly move the location of a few original calibration signal peaks, as opposed to adding extra calibration signal peaks. This means that the image content is implicitly in the calibration signal's jitter, and the copy attack is less likely to succeed unless the read and embedded images have the same perceptual hash. On the one hand, this approach may reduce robustness of the robust message to scaling, rotation and translation. On the other hand, no extra bits containing the output of the perceptual hash need to be embedded in the robust message.

Based upon a different basic approach for stopping the copy attack, one could create a 16-bit key from the perceptual hash described above (or similar key from any perceptual hash) and use it to encrypt (using RSA or DES) or scramble (using XOR) the payload and CRC bits before embedding them with an embedding protocol, which may include convolution and/or repetition. This means that the reader can only correctly decrypt or descramble the payload and CRC bits if the perceptual hash of the read image matches that of the embedded image. Thus, the copy attack is less likely to be successful without requiring extra bits to be included to carry the output of the perceptual hash. This 16-bit key could use any method of feature based identification or vector creation, such as listed in U.S. Pat. Nos. 4,677,466, 5,436,653, 5,612,729, 5,572,246, 5,621,454, and 5,918,223, and PCT patent applications WO01/20483 and WO01/20609, which are hereby incorporated by reference.

Broadcast Monitoring and Quality of Service With a Watermark

When content is watermarked with a unique identifier (ID), any receiver with a watermark detector can monitor what content is retrieved. The content can be identified by name via resolving the ID in a secondary database that contains at least IDs and related names, potentially including content owners who should be informed that the content was distributed. The assignee has several patent applications related to this invention. See, for example, U.S. patent application Ser. No. 09/571,422, filed May 15, 2000 (now U.S. Pat. No. 6,947,571), Ser. No. 09/563,664, filed May 2, 2000 (now U.S. Pat. No. 6,505,160), and Ser. No. 09/574,726, filed May 18, 2000, which are incorporated herein by reference.

However, an interesting improvement is that the quality of the watermark can be measured and used to measure quality of service for the distributor, who most likely is a broadcaster who wants to know that its broadcasts are being received with high-quality.

The quality of the watermark can be determined in many fashions including using semi-fragile watermarks as described in this document with the application of copy resistance in mind. Measuring the degradation of the watermark in the received media signal provides an indicator of quality of service.

For a packet distribution system, such as IP (Internet Protocol), a Quality of Service (QoS) method based upon semi-fragile watermarks is better than looking for dropped packets since it determines the effect of those packets on the video or audio. Many Internet video and audio players can re-create packets, and during times of slow scene changes, the quality may not be degraded badly. In addition, when the digital watermarks embedded in the packet stream have time segmented payloads that repeat at a defined or synchronized interval in the video or audio, the QoS of the video or audio can be measured over time by measuring the quality of the imperceptible digital watermark in the received video or audio stream.

Measuring the Watermark Signal for Authentication and Quality of Service

There are multiple metrics for assessing watermark strength, including the degree of correlation between the reference watermark signal and the detected watermark signal, and a measure of symbol errors in the raw message estimates of the watermark message payload. One way to measure the symbol errors is to reconstruct the raw message sequence using the same error correction coding process of the watermark embedder on the valid message extracted from the watermark. This process yields, for example, a string of 1000 binary symbols, which can be compared with the binary symbols estimated at the output of the spread spectrum demodulator. The stronger the agreement between the reconstructed and detected message, the stronger the watermark signal.

To illustrate this method, it is useful to review how to embed the digital watermark message signal imperceptibly in the host media signal. In the embedder, the embedded bit sequence is created by error correction encoding a message payload, such as BCH coding, turbo coding, convolutional coding, Reed Solomon, etc. This embedded bit sequence is then spread spectrum modulated with a carrier signal, such as a pseudorandom sequence and embedded into the host media signal by subtly modifying the signal (e.g., adding a binary antipodal watermark signal resulting from the spread spectrum modulation to spatial or frequency domain samples of the host media signal).

Now, referring to the watermark detector, an approach for measuring the strength of the watermark signal is as follows:
1. Use the message payload read from the watermark to re-create the original embedded bit sequence (including redundantly encoded bits from error correction coding) used for the watermark.
2. Convert the original bit sequence so that a zero is represented by −1 and a one is represented by 1.
3. Multiply (element-wise) the soft-valued bit sequence used to decode the watermark by the sequence of step 2. In particular, the digital watermark reader produces a soft-valued bit sequence estimated from spread spectrum demodulating the watermark signal, and supplies the soft-valued sequence to the error correction decoder, such as a Viterbi decoder, which produces an error corrected message payload. The soft-valued sequence represents an estimate of the original, error correction encoded bit sequence values along with a probability or confidence value for each bit sequence value. The reader derives the soft value by aggregating (e.g., summing) the estimates from demodulated chips of the spread spectrum sequence used to encode that bit.
4. Create one or more measures of watermark strength from the sequence resulting in the previous step. One such measure is the sum of the squares of the values in the sequence. Another measure is the square of the sum of the values in the sequence. Other measurements are possible as well. For example, soft bits associated with high frequency components of the watermark signal may be analyzed to get a strength measure attributed to high frequency components. Such high frequencies are likely to be more sensitive to degradation due to photocopying, digital to analog and analog to digital conversion, scanning and re-printing, broadcast process distortion, etc.
5. Compare the strength measures to thresholds to decide if the suspect image has been captured from an original or a copy of the printed object. For print object authentication, the threshold is derived by evaluating the difference in measured watermark strength of copied vs. original media objects on the subject printer platform used to create the original, and a variety of copiers, scanners and printers used to create copies. For quality of service measurement, the measurement of watermark signal strength at a receiver provides an indicator of video or audio signal quality at the receiver.

This same technique of measuring symbol errors can be applied to two or more different watermarks embedded at different spatial resolutions. Each of the watermarks may have the same or different message payloads. In the first case where the watermarks have the same message payloads, the message extracted from one of the watermarks may be used to measure bit errors in each of the other watermarks. For example, the message payload from a robust watermark embedded at a low spatial resolution may be used to measure the bit errors from a less robust watermark at a higher spatial resolution. If the watermarks carry different message payloads, then error coding, such as convolutional, Reed Solomon, or Turbo coding, and error detection bits, such as CRC bits, can be used in each message payload to ensure that the message is accurately decoded before recreating the original, embedded bit sequence.

Using two or more different watermarks enables a threshold to be set based on the ratio of the signal strength of the watermarks relative to each other. In particular, the signal strength of a first watermark at a high resolution (600-1200 dpi) is divided by the signal strength of a second watermark at a lower resolution (75-100 dpi). In each case, the signal strength is measured using a measure of symbol errors or some other measure (e.g., correlation measure).

If the measured strength exceeds a threshold, the detector deems the watermark signal to be authentic and generates an authentication signal. This signal may be a simple binary value indicating whether or not the object is authentic, or a more complex image signal indicating where bit errors were detected in the scanned image. For quality of service measurement, the ratio of signal strength provides a measure of the quality of service.

The watermark and host signal can be particularly tailored to detect copying by photo-duplication and printing/re-scanning of the printed object. Likewise, the watermark signal can be tailored to detect video quality degradation for quality of service measurements. This entails embedding the watermark at particular spatial and/or temporal frequencies/resolutions that are likely to generate message symbol errors when the object is re-printed or broadcast. This detection process has an additional advantage in that it enables automatic authentication and/or quality of service measurement, it can be used with lower quality camera devices such as web cams and common image scanners, and it allows the watermark to serve the functions of determining authenticity as well as carrying a message payload useful for a variety of applications. For video quality of service measurements, the detection process can take place in the same hardware used to handle the video signal (assuming the video has a digital representation).

The message payload can include an identifier or index to a database that stores information about the object or a link to a network resource (e.g., a web page on the Internet). The payload may also include a covert trace identifier associated with a particular authentic item, batch of items, printer, or distributor. This enables a counterfeit object, or authentic object that has been printed without authority to be detected and traced to a particular source, such as its printer, distributor or batch number.

The payload may also carry printer characteristics or printer type information that enables the watermark reader to adapt its detection routines to printer types that generated the authentic object. For example, the payload may carry an identifier that specifies the type of print process used to create the authentic image, and more specifically, the attributes of the halftone screen. With this information, the reader can check authenticity by determining whether features associated with the halftone screen exist in the printed object. Similarly, the reader can check for halftone screen attributes that indicate that a different halftone screen process has been used (e.g., a counterfeit has been created using a different halftone screen). One specific example is a payload that identifies the halftone screen type and paper type. The reader extracts this payload from a robust watermark payload and then analyzes the halftone screen and paper attributes to see if they match the halftone type and paper type indicated in the watermark payload. For example, the halftone type can specify the type of unstable screen used to create an authentic image. If this unstable screen is not detected (e.g., by absence of a watermark embedded in the unstable screen), then the image is considered to be a fake.

A related approach for analyzing halftone type is to look for halftone attributes, like tell-tale signs of stochastic halftone screens vs. ordered dither matrix type screens. Dither matrix screens used in low end printers tend to generate tell tale patterns, such as a pattern of peaks in the Fourier domain that differentiate the halftone process from a stochastic screen, such as an error diffusion process, which does not generate such tell-tale peaks. If the reader finds peaks where none were anticipated, then the image is deemed a fake. Likewise, if the reader finds no peaks where peaks were anticipated, then the image is also deemed a fake. Before performing such analysis, it is preferable to use the embedded digital watermark to re-align the image to its original orientation at the time of printing. Attributes due to the halftone screen can then be evaluated in a proper spatial frame of reference. For example, if the original ordered dither matrix printer created an array of peaks in the Fourier domain, then the peak locations can be checked more accurately after the image is realigned.

For quality of service measurement of broadcast signals, the payload may be used to carry information about the type of broadcast, or type of video processing used to create the broadcast video. The detector can then use this information to adapt the watermark signal measurements for the type of broadcast or video processing environment. For example, for certain types of broadcasts, watermark signal measurement can be made at selected frequencies and/or particular locations within the broadcast data stream. Also, the payload can be used to trigger certain types of quality measurements on surrounding frames of video from which the payload was extracted, and/or on particular parts of the frame where the watermark has been specifically embedded for quality of service measurements.

The above methods for measuring quality of service of video and audio broadcasts apply to both radio frequency broadcasts as well as digital network broadcasts, just to name a few examples. In the case of a digital signal, the quality of the received "raw" digital signal can be judged by any number of Channel State Measurement techniques that have been proposed. In the context of multimedia transmitted digitally over a network (like the internet), there can be congestion and packet losses. In this case, the communication channel does not have a guaranteed bandwidth; it only has some statistical description of availability. For video and audio, the solution is to use buffers at the receiver and transmitter to even out the statistical fluctuations in bandwidth. Still, there may be temporary periods with frame dropouts and/or other distortion artifacts. In these cases, quality of service monitoring is used to determine the quality of the reception over the network. The receiver can measure quality by determining when frames of video or audio have been lost or delayed. In addition, digital watermarks embedded in the video and/or audio can be used to give a more accurate measure of the actual quality of the delivered video; additionally, it has the advantage that it is independent of the video/audio coding standard used. In the case of quality of service monitoring on networks, the digital watermarks are preferably embedded temporally, as well as spatially (for media signals with a spatial component like video).

The digital watermark is embedded temporally by embedding it across time segments, such as by spreading and/or repeating the watermark signal across multiple frames, so that the watermark detector can assess the degradation of the watermark over those time frames. For instance, the watermark can be spread over time just as it is spread over space by spread spectrum modulating the watermark message with a carrier signal that spans a particular sequence of time frames. The message can then be repeated over blocks of these time frames. The watermark may also carry a time dependent payload so that time frames where the video or audio signal has been degraded can be identified through the payload. For example, portions of the stream where a watermark payload cannot be decoded indicate portions of the stream where the quality of service has been degraded.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the embedding processes may be implemented in a programmable computer or a special purpose digital circuit. Similarly, detecting processes may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of measuring quality of service of a broadcast media signal using a digital watermark embedded in the broadcast media signal, the method comprising:

extracting a digital watermark from the broadcast media signal; and evaluating the extracted digital watermark relative to a reference digital watermark to measure degradation in quality of service of the broadcast media signal based on differences between the extracted and reference digital watermarks;

wherein the evaluating includes comparing signal peaks of the broadcast media signal and the reference digital watermark.

2. The method of claim 1 wherein the signal peaks comprise frequency domain peaks.

3. The method of claim 1 wherein the evaluating includes measuring signal strength of the extracted watermark by measuring differences between a watermark message signal decoded from the broadcast media signal and a reference watermark message signal.

4. The method of claim 3 wherein the watermark message signal decoded from the broadcast media signal is spread spectrum demodulated from the broadcast media signal.

5. A method of measuring quality of service of a broadcast media signal using a digital watermark embedded in the broadcast media signal, the method comprising:

extracting a digital watermark from the broadcast media signal; and evaluating the extracted digital watermark relative to a reference digital watermark to measure degradation in quality of service of the broadcast media signal based on differences between the extracted and reference digital watermarks;

wherein the evaluating includes comparing signal peaks of the broadcast media signal and the reference digital watermark.

6. The method of claim 5 wherein the signal peaks comprise frequency domain peaks.

7. A method of assessing the quality of a media signal that has undergone processing, comprising:

steganographically encoding the signal with a watermark by a process that includes transforming the signal into plural coefficients, and adjusting a relationship between first and second coefficients to a known value;

processing the encoded media signal; and analyzing the processed media signal by a process that includes transforming the processed media signal into plural coefficients, detecting a relationship between said first and second coefficients, and comparing said detected relationship versus said known value to thereby discern qualitative information about the processing of said media signal.

8. The method of claim 7 wherein said relationship comprises a ratio between strengths of said first and second coefficients.

9. A method of assessing the quality of a media signal that has undergone processing, comprising:

encoding the signal with a watermark by a process that includes modifying the signal to include a steganographic calibration signal by which affine transformation of the signal can be identified and compensated for, said calibration signal including peaks at first and second frequencies, said peaks having first and second values, respectively, said values having a first relationship;

processing the encoded media signal; and analyzing the processed media signal by a process that includes detecting said peaks therein, determining a second relationship between the strengths thereof, and comparing the second relationship to the first relationship, to thereby discern qualitative information about the processing of said media signal.

10. The method of claim 9 wherein said first and second relationships comprise ratios between strengths of said first and second coefficients.

11. A method of measuring quality of service of a broadcast media signal using a digital watermark embedded in the broadcast media signal, the method comprising:

extracting a digital watermark from the broadcast media signal; and evaluating the extracted digital watermark relative to a reference digital watermark to measure degradation in quality of service of the broadcast media signal based on differences between the extracted and reference digital watermarks;

wherein the media signal comprises video that has been conveyed in MPEG form, and the extracting includes decoding a digital watermark signal encoded in frequency coefficients of a wavelet domain transformation of said video.

12. The method of claim 11 wherein the extracting includes decoding a digital watermark signal encoded in frequency coefficients of a wavelet domain transformation of a luminance component of said video.

13. The method of claim 11 wherein the extracting includes decompressing the video from the MPEG form in which it was conveyed.

14. The method of claim 11 the evaluating includes comparing a sequence of encoded message symbols with a sequence of decoded message symbols, to identify symbol errors therebetween.

15. A method of measuring quality of service of a broadcast media signal using a digital watermark embedded in the broadcast media signal, the method comprising:

extracting a digital watermark from the broadcast media signal, the digital watermark comprising a sequence of symbols; and evaluating extracted digital watermark data relative to reference digital watermark data to measure degradation in quality of service of the broadcast media signal;

wherein the evaluating includes determining a number of correctly detected watermark symbols out of a total set of watermark symbols.

16. The method of claim 15 that includes:

applying an error correction algorithm to the extracted sequence of symbols to produce an original message payload corresponding thereto;

applying an error correction-encoding processing to said original message payload, to generate an originally embedded sequence of symbols; and comparing the extracted sequence of symbols with said original embedded sequence of symbols.

17. A method for measuring quality of service of a distributed media signal comprising:

originally encoding digital watermark data in the media signal prior to distribution of said signal from a first computer;

alter distribution, decoding digital watermark data from the distributed signal at a second computer distinct from the first; and comparing the encoded and decoded digital watermark data to assess quality of service;

wherein the method includes determining the originally encoded digital watermark data at the second computer, from the distributed signal, without separately communicating information about the originally encoded digital watermark data from the first computer to the second computer.

* * * * *